United States Patent
Wang et al.

(10) Patent No.: US 11,463,037 B2
(45) Date of Patent: Oct. 4, 2022

(54) MOTOR CONTROL SYSTEM AND METHOD OF CONTROLLING THE SAME

(71) Applicant: DELTA ELECTRONICS, INC., Taoyuan (TW)

(72) Inventors: Te-Wei Wang, Taoyuan (TW); Yi-Kai Peng, Taoyuan (TW); Chen-Yeh Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/354,405

(22) Filed: Jun. 22, 2021

(65) Prior Publication Data

US 2022/0077808 A1 Mar. 10, 2022

Related U.S. Application Data

(60) Provisional application No. 63/076,591, filed on Sep. 10, 2020.

(51) Int. Cl.
| | |
|---|---|
| *H02P 27/06* | (2006.01) |
| *H02P 3/18* | (2006.01) |
| *H02M 7/5387* | (2007.01) |
| *H02P 29/024* | (2016.01) |

(52) U.S. Cl.
CPC ........ *H02P 27/06* (2013.01); *H02M 7/53871* (2013.01); *H02P 3/18* (2013.01); *H02P 29/025* (2013.01); *H02P 2207/05* (2013.01)

(58) Field of Classification Search
CPC .......... H02P 27/06; H02P 29/025; H02P 3/18; H02M 7/5395
See application file for complete search history.

(56) References Cited

U.S. PATENT DOCUMENTS

| | | | |
|---|---|---|---|
| 4,087,727 A | 5/1978 | Horiuchi et al. | |
| 6,441,573 B1 * | 8/2002 | Zuber | B60L 7/26 318/273 |
| 8,148,925 B2 * | 4/2012 | Jobard | B60L 7/003 318/362 |

(Continued)

FOREIGN PATENT DOCUMENTS

| | | |
|---|---|---|
| CN | 211089504 U | 7/2020 |
| DE | 3929407 A1 | 3/1991 |

(Continued)

*Primary Examiner* — Thai T Dinh
(74) *Attorney, Agent, or Firm* — Muncy, Geissler, Olds & Lowe, P.C.

(57) ABSTRACT

A motor control system is coupled to an input power source and a motor. The motor control system includes an inverter, a brake, and a controller. The inverter includes a plurality of upper-bridge transistors and a plurality of lower-bridge transistors, and the brake includes a plurality of loop switches. Each loop switch includes a first end, a second end, and a third end, and the third ends are respectively coupled to control ends of the lower-bridge transistors. The controller is coupled to the first end, and when the controller detects that the input power source is greater than a low-voltage protection value, the controller controls the third end to be coupled to the first end, and provides an upper-bridge drive signal assembly to operate each upper-bridge transistor, and provides a lower-bridge drive signal assembly to operate each lower-bridge transistor.

16 Claims, 8 Drawing Sheets

(56) References Cited

U.S. PATENT DOCUMENTS

| | | | |
|---|---|---|---|
| 8,207,700 B2* | 6/2012 | Syrman | B66B 1/308 |
| | | | 318/762 |
| 8,324,846 B2* | 12/2012 | Marchand | B60L 50/61 |
| | | | 318/362 |
| 2009/0167218 A1* | 7/2009 | Kallioniemi | H02P 6/24 |
| | | | 318/379 |
| 2017/0271952 A1 | 9/2017 | Gurr et al. | |

FOREIGN PATENT DOCUMENTS

| | | |
|---|---|---|
| EP | 3223592 A2 | 9/2017 |
| TW | 201236355 A | 9/2012 |

* cited by examiner

MOTOR CONTROL SYSTEM AND METHOD OF CONTROLLING THE SAME

CROSS-REFERENCE TO RELATED APPLICATION

This patent application claims the benefit of U.S. Provisional Patent Application No. 63/076,591, filed Sep. 10, 2020, which is incorporated by reference herein.

BACKGROUND

Technical Field

The present disclosure relates to a motor control system and a method of controlling the same, and more particularly to a motor control system with a brake function and a method of controlling the same.

Description of Related Art

The statements in this section merely provide background information related to the present disclosure and do not necessarily constitute prior art.

Nowadays, a motor control apparatus (such as an elevator) with displacement driven by a motor is usually controlled by one or more electromagnetic brakes in power failure braking technology. When the AC mains is interrupted (failed), the motor bearing is tightly clamped by a spring to avoid the belt or cable from sliding. When the AC mains normally supplies power, one or more electromagnetic brakes are energized to release the clamping force to make the motor work. That is, the electromagnetic brake makes the motor control apparatus work, and the return of the spring makes the motor control apparatus stop.

This design can ensure that the motor is locked to avoid sliding when the power electricity is interrupted. In some applications of motor control apparatuses (for example but not limited to, treadmills, escalators, etc.), however, the running belt is usually allowed to slide slightly (resistance is required) when the power electricity is interrupted in order to avoid that when someone is trapped, the running belt is bitten and cannot get out of the trap by himself. Therefore, the circuit structure and control manner of motor control apparatuses used in elevators are not suitable for treadmills, escalators, and other similar equipment. Moreover, the mechanical brake apparatus of the motor control apparatus used in the elevator requires regular maintenance, which will inevitably increase the burden on the user. Generally, the mechanical brake apparatus has a high cost and needs to be installed in a small treadmill control box, which makes it impossible to reduce construction costs and miniaturization.

Accordingly, the present disclosure provides a motor control system and a method of controlling the same to replace the traditional clamping braking manner of the mechanical braking apparatus.

SUMMARY

In order to solve the above-mentioned problems, the present disclosure provides a motor control system. The motor control system is coupled to an input power source and a motor. The motor control system includes an inverter, a brake, and a controller. The inverter includes a plurality of upper-bridge transistors and a plurality of lower-bridge transistors. A first end of each upper-bridge transistor is coupled to a high-voltage level of the input power source, a second end of each upper-bridge transistor is correspondingly coupled to a first end of each lower-bridge transistor, and a second end of each lower-bridge transistor is coupled to a low-voltage level of the input power source. The brake includes a plurality of loop switches. Each loop switch has a first end, a second end, and a third end. The third end of each loop switch is correspondingly coupled to a control end of each lower-bridge transistor, and the third end of each loop switch is selectively coupled to the first end or the second end. The controller is coupled to a control end of each upper-bridge transistor and the first end of each loop switch. When the controller detects that the input power source is greater than a low-voltage protection value, the controller controls the third end of each loop switch to couple to the first end, and the controller provides an upper-bridge drive signal assembly to operate each upper-bridge transistor and provides a lower-bridge drive signal assembly to operate each lower-bridge transistor so as to drive the motor.

In order to solve the above-mentioned problems, the present disclosure provides a motor control method applied to a motor control system. The motor control system is coupled to an input power source and a motor. The motor control system includes a brake and an inverter. The inverter includes a plurality of upper-bridge transistors and a plurality of lower-bridge transistors. Each upper-bridge transistor is coupled to a high-voltage level of the input power source and correspondingly coupled to each lower-bridge transistor, and each lower-bridge transistor is coupled to a low-voltage level. The brake includes a drive loop and a brake loop, and the drive loop and the brake loop are coupled to each lower-bridge transistor. The method includes steps of: determining whether the input power source is less than a low-voltage protection value, and turning on the drive loop and turn off the brake loop when the input power source is greater than the low-voltage protection value. When the drive loop is turned on, an upper-bridge drive signal assembly is provided to operate each upper-bridge transistor, and a lower-bridge drive signal assembly is provided to operate each lower-bridge transistor through the drive loop so as to drive the motor.

The main purpose and effect of the present disclosure is to use characteristics of the permanent magnet motor and the brake to generate the braking force so as to replace the mechanical brake apparatus, reduce the maintenance cost, and increase the flexibility of the mechanism design.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
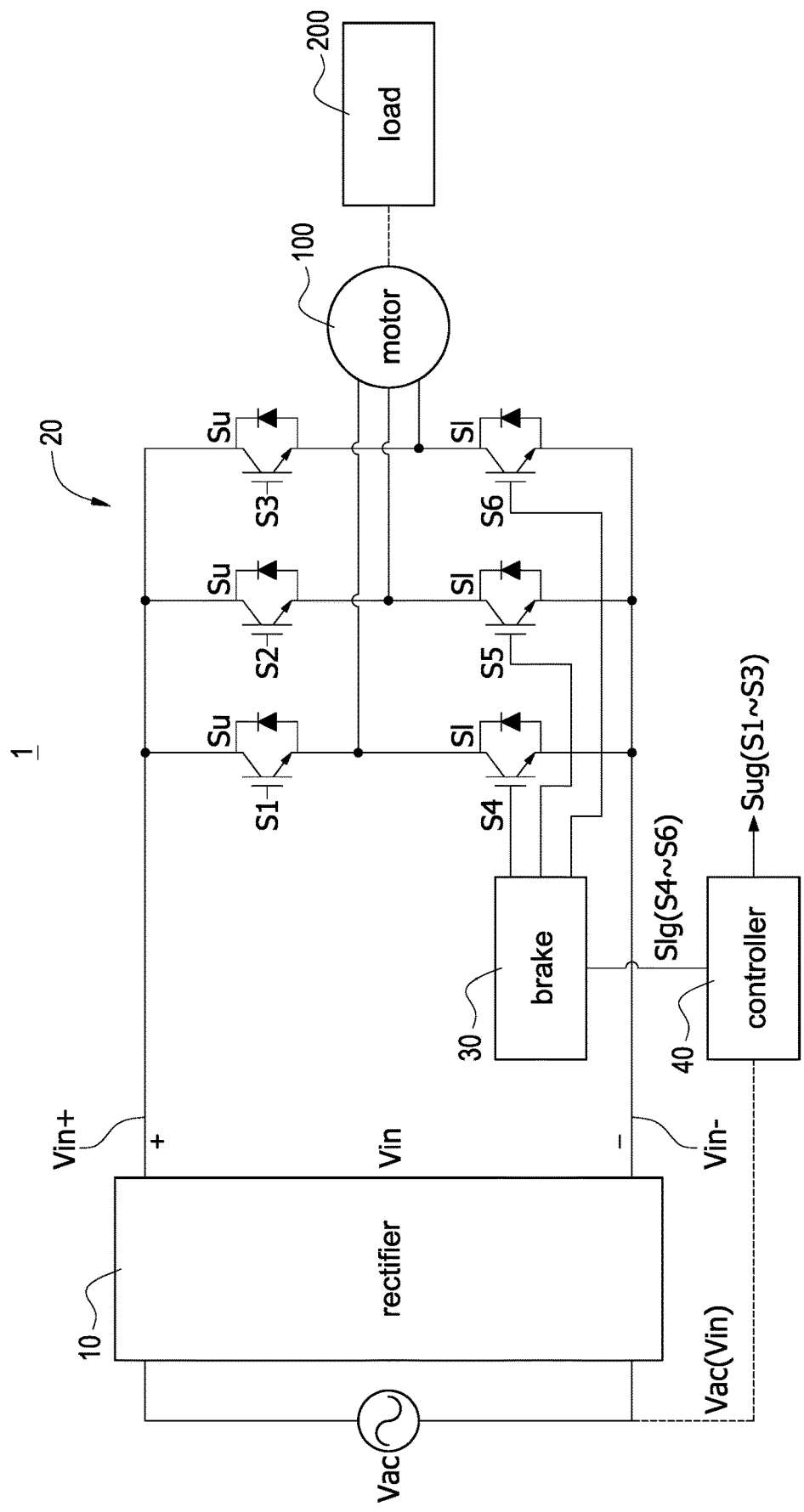
FIG. 1 is a block diagram of a motor control system with a brake function according to present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block diagram of a motor control system with a brake function according to present disclosure. The motor control system 1 receives an AC power source Vac to drive a motor 100 to rotate so that the motor 100 drives a load 200, such as but not limited to a belt. The motor control system 1 includes a rectifier 10, an inverter 20, a brake 30, and a controller 40. The rectifier 10 converts the AC power source Vac into a DC input power source Vin. The inverter 20 is coupled to the rectifier 10, and receives the input power source Vin. The controller 40 is coupled to the inverter 20, and provides an upper-bridge drive signal assembly Sug and a lower-bridge drive signal assembly Slg (such as pulse-width modulation (PWM) signals) according to a feedback (such as an output feedback or an input feedback) of the motor control system 1 to control the inverter 20 to convert the input power source Vin into a three-phase power source to drive the motor 100 to rotate.

Specifically, the inverter 20 includes a plurality of upper-bridge transistors Su and a plurality of lower-bridge transistors S1. A switch bridge arm is composed of each upper-bridge transistor Su and the corresponding lower-bridge transistor S1, and the switch bridge arms are coupled in parallel. The number of switch bridge arms may be determined according to the requirements of the motor 100. For example, but not limited to, three switch bridge arms may be used to control a three-phase motor. In particular, the number of signals of the upper-bridge drive signal assembly Sug including signals S1-S3 corresponds to the number of the upper-bridge transistors Su, and the number of signals of the lower-bridge drive signal assembly Slg including signals S4-S6 corresponds to the number of the lower-bridge transistors S1. One end of each upper-bridge transistor Su is coupled to a high-voltage level Vin+ of the input power source Vin, and the other end of each upper-bridge transistor Su is correspondingly coupled to one end of each lower-bridge transistor S1. The other end of each lower-bridge transistor S1 is coupled to a low-voltage level Vin- of the input power source Vin. Each phase of the motor 100 is correspondingly coupled to a common node between each upper-bridge transistor Su and each lower-bridge transistor S1. The controller 40 is coupled to a control end of each upper-bridge transistor Su, and provides the upper-bridge drive signal assembly Sug to control turning on and turning off the upper-bridge transistors Su.

The brake 30 is coupled between a control end of each lower-bridge transistor and the controller 40. The controller 40 controls the brake 30 to generate a drive loop or a brake loop according to the condition of the input power source Vin. When the controller 40 detects that the input power source Vin is normal, the controller 40 controls the brake 30 to generate the drive loop so that the lower-bridge drive signal assembly Slg provided by the controller 40 can be correspondingly provided to each lower-bridge transistor S1 to control the inverter 20 driving the motor 100 to rotate. When the controller 40 detects that the input power source Vin is abnormal, the controller 40 controls the brake 30 to generate the brake loop so that the lower-bridge drive signal assembly Slg provided by the controller 40 fails to be provided to the lower-bridge transistor S1 through the brake 30. At this condition, the controller 40 provides a control of braking the motor 100 by controlling the lower-bridge transistor S1 through the brake loop so as to control the motor 100 to stop rotating. In one embodiment, the detection of the input power source Vin may be implemented by directly detecting an output end of the rectifier 10, or by detecting the AC power source Vac. The controller 40 may by supplied power by the AC power source Vac or the input power source Vin indicated as a dashed line with an arrow.

In one embodiment, the motor 100 may be a permanent magnet motor. When the controller 40 provides the control of braking the motor 100 by controlling the lower-bridge transistor S1 through the brake loop, the motor 100 generates a back electromotive force (back EMF) to feed back to the inverter 20. If the back EMF cannot be released, it will cause the motor 100 to uncontrollably rotate to endanger the user of the treadmill. Also, it will cause the time of braking the motor 100 to be prolonged, thereby delaying the time of stopping the motor 100. Therefore, when the permanent magnet motor is braked, the controller 40 controls the brake 30 to generate the brake loop to release the back EMF generated from the motor 100, thereby shortening the time of braking the motor 100 to avoid endangering the user due to arbitrary/uncontrollable rotation of the motor 100.

Figure 2A:
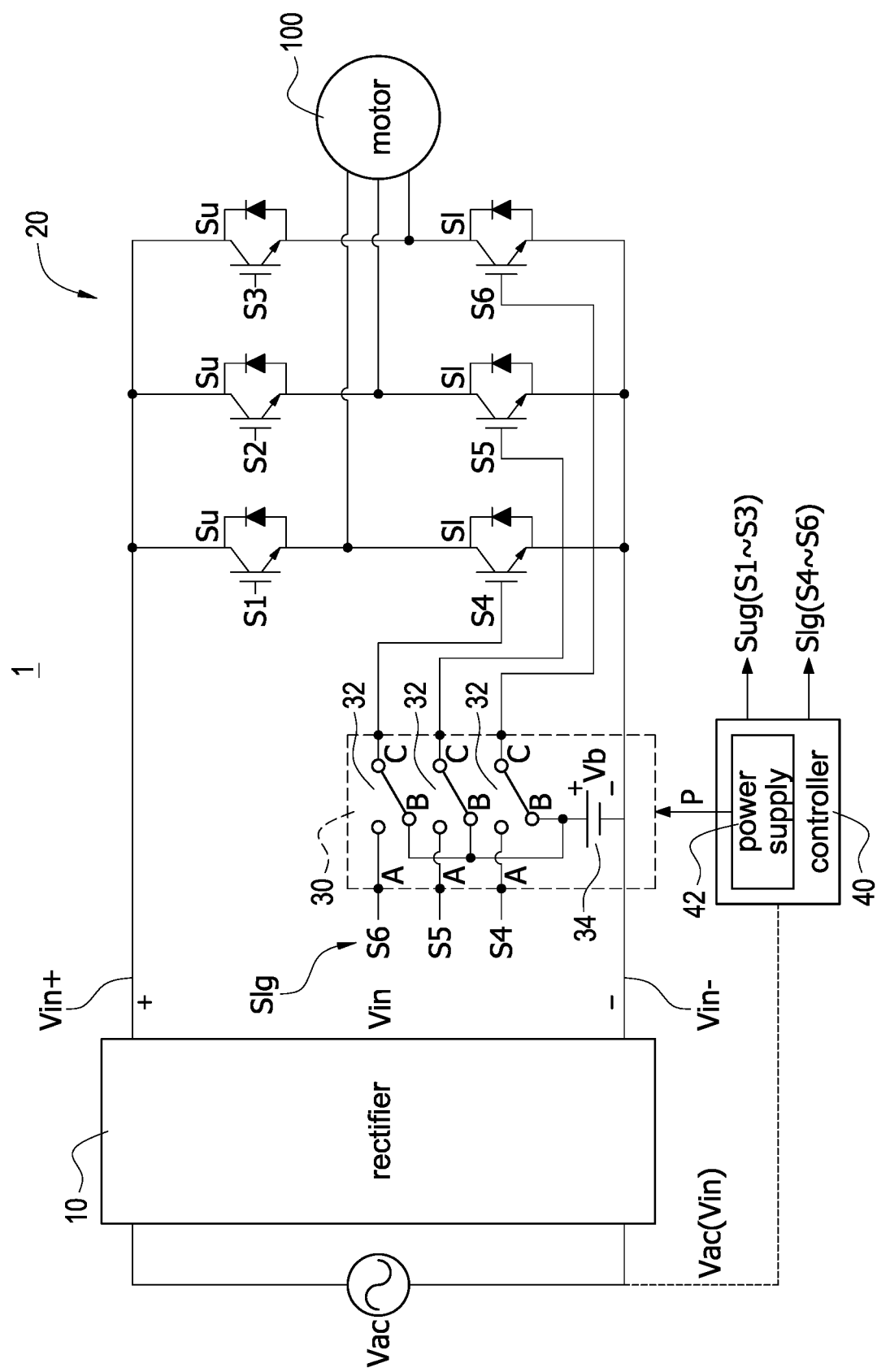
FIG. 2A is a block diagram of the motor control system with the brake function according to a first embodiment of the present disclosure.

Please refer to FIG. 2A, which shows a block diagram of the motor control system with the brake function according to a first embodiment of the present disclosure, and also refer to FIG. 1. The brake 30 includes a plurality of loop switches 32 (the number thereof depends on the number of the lower-bridge transistors S1) and a battery 34. Each loop switch 32 has a first end A, a second end B, and a third end C. The first end A of each loop switch 32 is coupled to the controller 40 to receive the lower-bridge drive signal assembly Slg (including signals S4-S6). The second end B of each loop switch 32 is coupled to a positive pole of the battery 34. The third end C of each loop switch 32 is correspondingly coupled to the control end of the lower-bridge transistor S1. In this embodiment, each loop switch 32 is a normally-open three-way. When there is no power supply or signal control, the third end C is coupled to the second end B, otherwise, the third end C is controlled to be coupled to the first end A. The controller 40 includes a power supply 42, and the power supply 42 controls the third end C of the loop switch 32 to be selectively coupled to the first end A or the second end B.

For the upper-bridge transistors Su, when the controller 40 detects that the input power source Vin is normal, the controller 40 provides the upper-bridge drive signal assembly Sug (including signals S1-S3) to control turning on and turning off the upper-bridge transistors Su to drive the motor 100. When the controller 40 detects that the input power source Vin is interrupted, the controller 40 turns off each of the upper-bridge transistors Su to brake the motor 100.

For the lower-bridge transistors S1, when the controller 40 detects that the input power source Vin is normal, the power supply 42 operates to provide power P to supply the loop switch 32 so that the loop switch 32 is excited to couple the third end C to the first end A to generate the drive loop. The lower-bridge drive signal assembly Slg (including signals S4-S6) generated by the controller 40 is provided to the corresponding lower-bridge transistor S1 through the couple between the third end C and the first end A of the loop switch 32. When the controller 40 detects that the input power source Vin is interrupted, the power supply 42 does not work without power electricity so that the third end C is coupled to the second end B of the loop switch 32 to generate the brake loop. At this condition, the controller 40 cannot provide the lower-bridge drive signal assembly Slg because of no power electricity. When the third end C is coupled to the second end B, the battery 34 provides a battery power Vb to the control end of the lower-bridge transistor S1 to make the lower-bridge transistor S1 constantly turn on. At this condition, when the motor 100 is braked, the back EMF is released through the lower-bridge transistor S1 to the low-voltage level Vin− of the input power source Vin, thereby avoiding raising the level of the input power source Vin (transient state).

Afterward, when the input power source Vin returns to be normal from interruption, the controller 40 and the power supply 42 work with power electricity again. The controller 40 provides the lower-bridge drive signal assembly Slg (including signals S4-S6) again, and the power supply 42 provides the power P again to excite each loop switch 32 so that the third end C is coupled to the first end A of each loop switch 32. In one embodiment, the source of the power P used to excite the loop switch 32 is not limited to only being provided by the power supply 42. For example, but not limited to, the loop switch 32 may be directly coupled to the high-voltage level Vin+ of the input power source Vin so that the input power source Vin is used to provide the required power for exciting the loop switch 32.

Figure 2B:
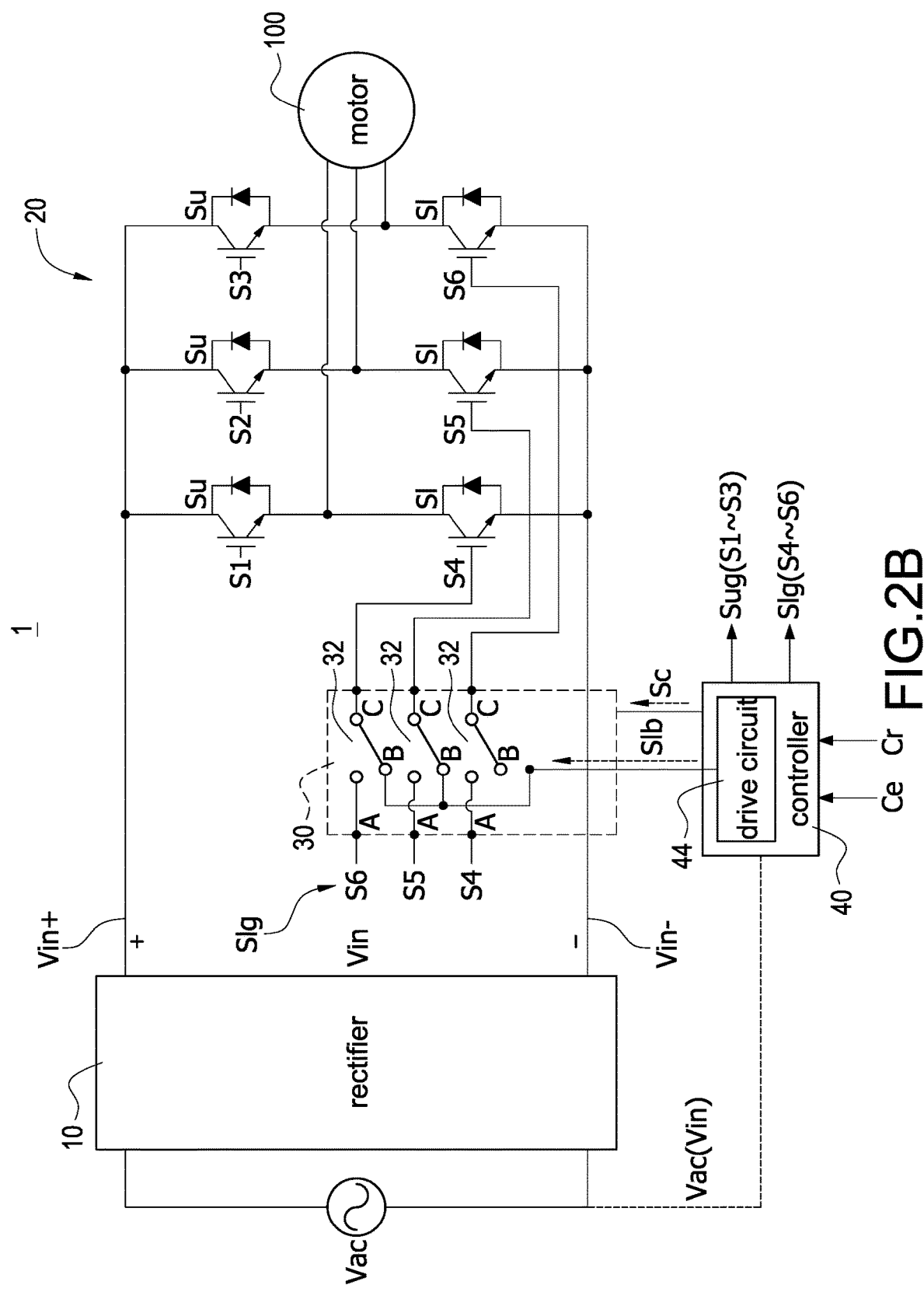
FIG. 2B is a block diagram of the motor control system with the brake function according to a second embodiment of the present disclosure.

Please refer to FIG. 2B, which shows a block diagram of the motor control system with the brake function according to a second embodiment of the present disclosure, also refer to FIG. 1 to FIG. 2A. The brake 30 includes a plurality of loop switches 32, and second ends B of the loop switches 32 are coupled to the controller 40. The controller 40 provides the control signal Sc through the drive circuit 44 to control the third end C to be selectively coupled to the first end A or the second end B. A state between the third end C and the second end B is normally closed, and a state between the third end C and the first end A is normally open. The control signal Sc is used to control the third end C to be coupled to the first end A. The operation of the upper-bridge transistor Su under the normality and abnormality of the input power source Vin is similar to that of FIG. 2A, and the detail description is omitted here for conciseness.

When the controller 40 detects that the input power source Vin is normal, the controller 40 provides the control signal Sc to excite the loop switch 32 to control the third end C to be coupled to the first end A to generate the drive loop so that the lower-bridge drive signal assembly Slg (including signals S4-S6) is provided to the lower-bridge transistors S1 due to the couple between the third end C and the first end A. When the controller 40 detects that the input power source Vin is abnormal, the controller 40 does not provide the control signal Sc so that the third end C is coupled to the second end B of the loop switch 32 to generate the brake loop. At this condition, a lower-bridge brake signal Slb generated by the controller 40 is provided to the corresponding lower-bridge transistor S1 through the couple between the third end C and the second end B so as to brake the motor 100 by turning on and turning off the lower-bridge transistor S1. In this embodiment, the abnormality of the input power source Vin means when the controller 40 detects that the input power source Vin is less than or equal to a low-voltage protection value or receives an emergency stop command Ce. In some embodiments, when the input power source Vin is less than or equal to the low-voltage protection value, it means that the AC power source Vac may be abnormal or interrupted to cause the input power source Vin to be unstable, and therefore it is necessary to brake the motor 100. In some embodiments, when the controller 40 receives the emergency stop command Ce, it means that the user has pressed an emergency stop button due to unexpected situation, or the motor control system 1 has received certain warning signals (such as over temperature, over current, etc.), and therefore it is also necessary to brake the motor 100.

In particular, the lower-bridge brake signal Slb is a pulse-width modulation (PWM) signal. The controller 40 mainly controls a duty cycle and frequency of the lower-bridge brake signal Slb to implement the effect of braking the motor 100. Specifically, the controller 40 mainly adjusts the duty cycle of the lower-bridge brake signal Slb to adjust a braking force of braking the motor 100. When the duty cycle is larger, the braking force is larger, and vice versa. Therefore, the controller 40 can adjust the duty cycle of the lower-bridge brake signal Slb to avoid the brake stall state of the motor 100 during braking. The controller 40 determines whether the motor 100 enters the brake stall state by detecting the rotation speed of the motor 100. When the controller 40 detects that the current rotation speed of the motor 100 during braking is greater than the previous rotation speed, it means that the motor 100 may enter the brake stall state. At this condition, the controller 40 increase the duty cycle to increase the braking force of braking the motor 100, otherwise, the current braking force is maintained. In addition, the controller 40 mainly adjusts a switching frequency of the lower-bridge brake signal Slb to adjust a braking smoothness of braking the motor 100. When the switching frequency is higher, the braking smoothness is smoother, and vice versa. In this way, it may prevent the motor 100 from shaking during braking. Under normal circumstances, when the controller 40 receives the emergency stop command Ce, the controller 40 will adjust the duty cycle of the lower-bridge brake signal Slb according to the rotation speed of the motor 100 to protect the user from stopping the operation of the motor 100 in the safest condition.

The motor control system 1 includes an encoder (not shown). The controller 40 of the motor control system 1 may acquire the rotation angle of the motor 100 through the encoder to calculate the rotation speed of the motor 100 accordingly. Since the application of the encoder is a technology well known to those skilled in the art, the present disclosure will not further describe and illustrate the encoder.

When the input power source Vin returns to be greater than the low-voltage protection value from interruption or the controller 40 receives a return command Cr, the controller 40 provides the control signal Sc again to make the third end C be coupled to the second end B of the loop switch 32. Afterward, the controller 40 provides the lower-bridge drive signal assembly Slg (including signals S4-S6) again to control turning on and turning off the lower-bridge transistor S1.

Figure 2C:
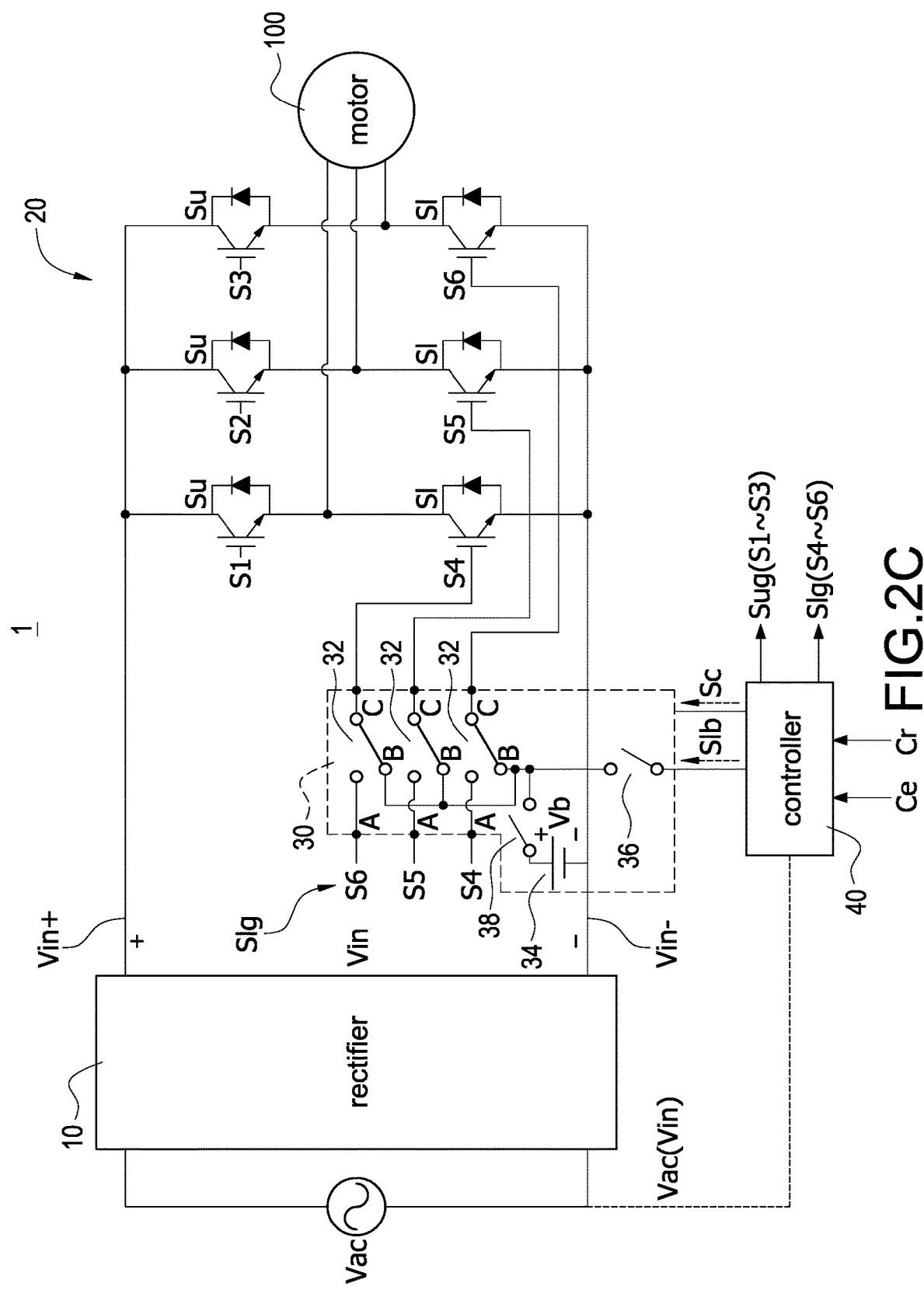
FIG. 2C is a block diagram of the motor control system with the brake function according to a third embodiment of the present disclosure.

Please refer to FIG. 2C, which shows a block diagram of the motor control system with the brake function according to a third embodiment of the present disclosure, and also refer to FIG. 1 to FIG. 2B. The circuit structure of FIG. 2C is an integration of FIG. 2A and FIG. 2B, which includes the braking mechanism when the input power source Vin is interrupted and abnormal or when the emergency stop command Ce is received. In the embodiment of FIG. 2C, the brake 30 further includes a brake switch 36 and a battery switch 38, and the brake loop includes a first brake loop and a second brake loop. The brake switch 36 is coupled to the second end B of the loop switch 32 and the controller 40 to form the first brake loop. The battery switch 38 is coupled to the second end B of the loop switch 32 and the battery 34 to form the second brake loop. The battery switch 38 may be a normally-closed switch, such as the relay or the transistor. When the controller 40 provides no signal, the battery switch 38 is turned on, otherwise, it is turned off. In comparison with the battery switch 38, the brake switch 36 may be a normally-open switch, such as the relay or the transistor.

When the controller 40 detects that the input power source Vin is less than or equal to the low-voltage protection value or receives the emergency stop command Ce, the controller 40 can still work and controls turning on the brake switch 36 so that the second end B of the loop switch 32 is coupled to the controller 40. At this condition, the controller 40 controls turning off the battery switch 38 so that the lower-bridge brake signal Slb may be provided to the lower-bridge transistor S1 through the brake switch 36. When the controller 40 detects that the input power source Vin is interrupted, the controller 40 may not work, and the battery switch 38 is turned on so that the second end B of the loop switch 32 is coupled to the battery 34. At this condition, the brake switch 36 is turned off so that the battery power Vb may be provided to the lower-bridge transistor S1. Since the operation of the circuit not mentioned in FIG. 2C is similar to that in FIG. 2A and FIG. 2B, the detail description is omitted here for conciseness.

Since it must be considered that when the input power source Vin is interrupted the controller 40 will also fail, the third end C and the second end B are normally closed, and the third end C and the first end A are normally open, which is a preferred embodiment. Therefore, when the controller 40 cannot work, it can return to the normally closed state where the third end C is coupled to the second end B. In addition, the battery switch 38 is preferably a normally-closed switch and the brake switch 36 is a normally-open switch. Therefore, when the controller 40 cannot work, it returns to the state where the battery 34 is coupled to the lower-bridge transistor S1.

Figure 3A:
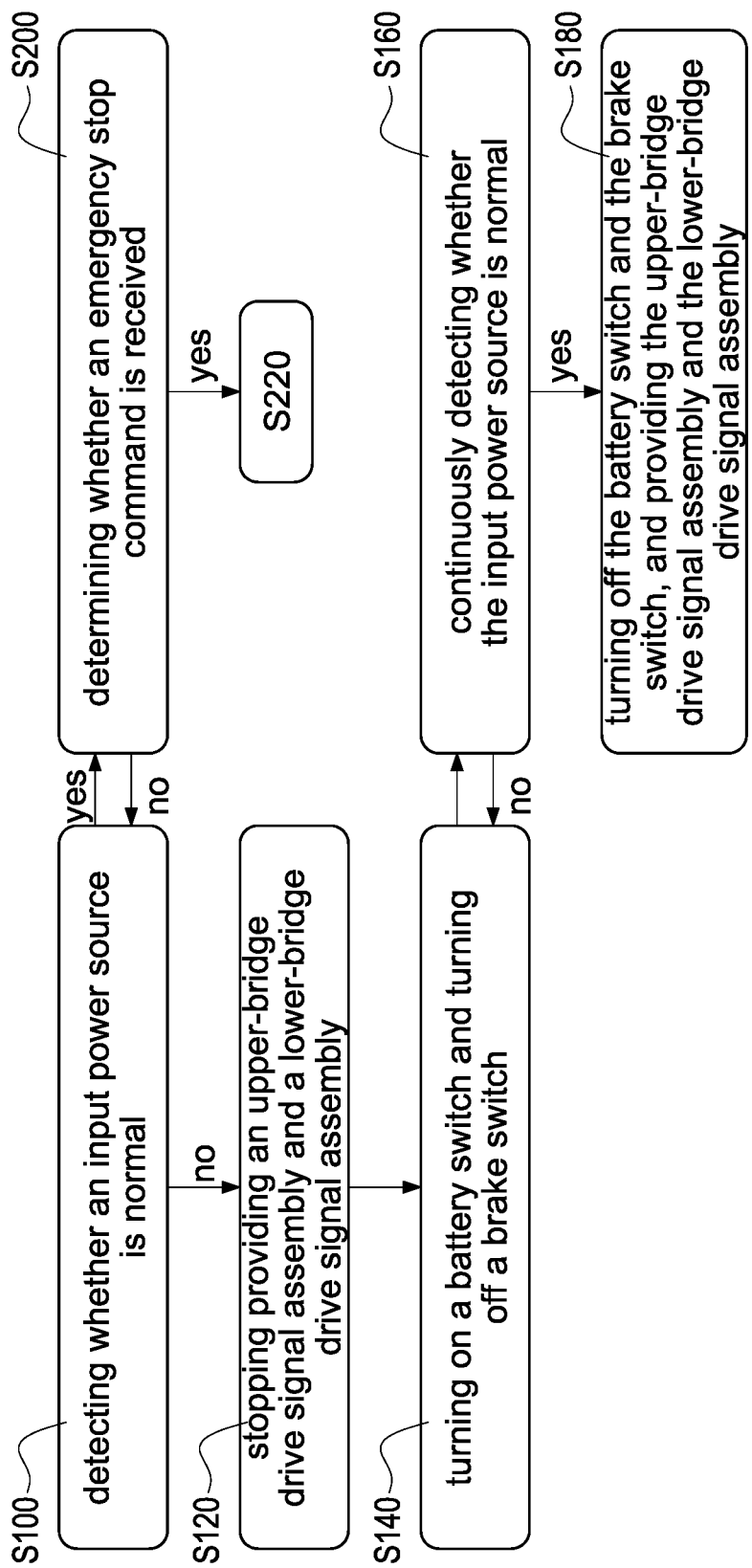
FIG. 3A and FIG. 3B are flowcharts of a motor control method according to a first embodiment of the present disclosure.
Figure 3B:
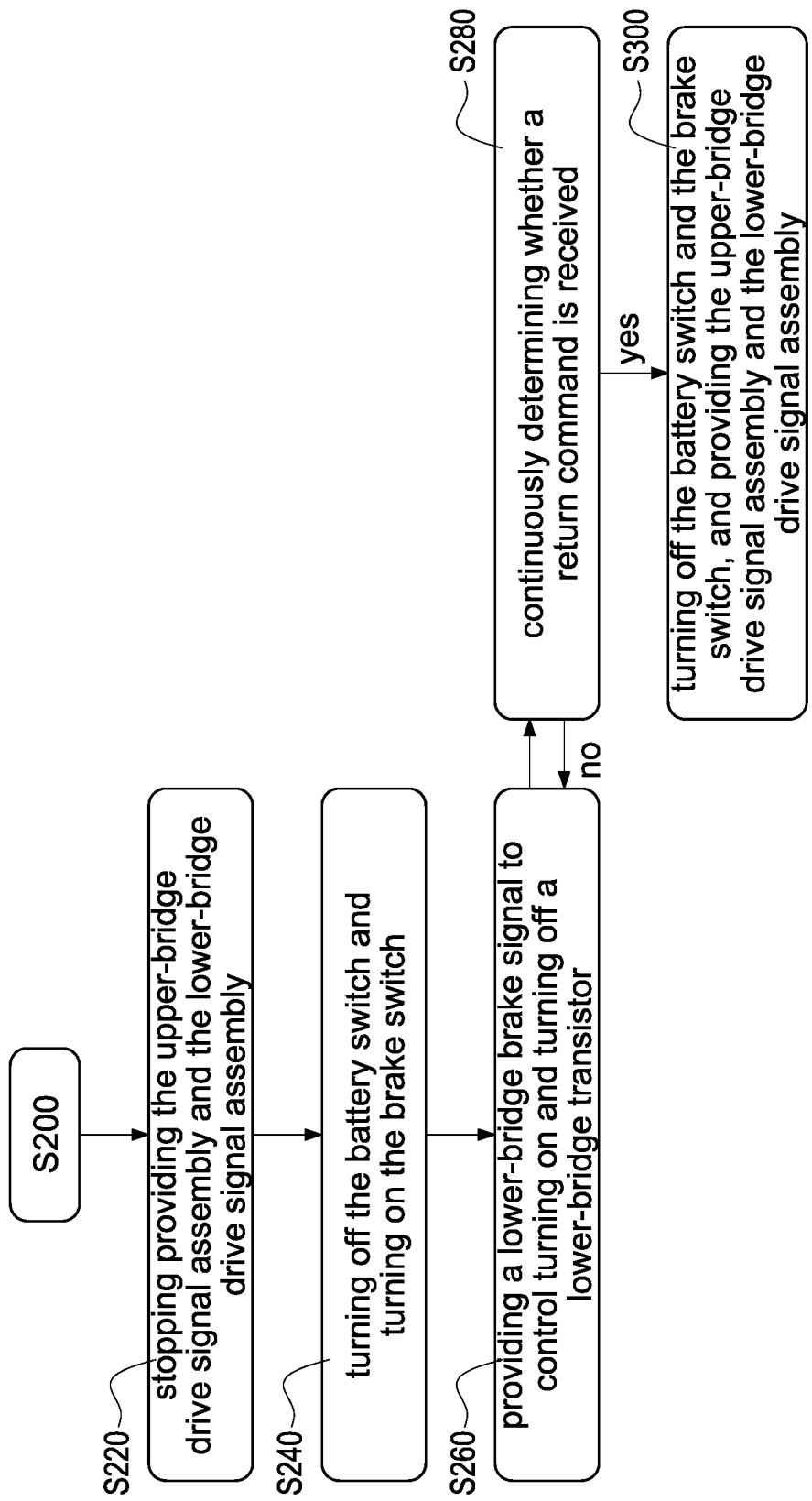

Please refer to FIG. 3A and FIG. 3B, which show flowcharts of a motor control method according to a first embodiment of the present disclosure, and also refer to FIG. 1 to FIG. 2C. The motor control method of the first embodiment is mainly applied to the circuit structure of FIG. 2C. The method includes steps of: detecting whether the input power source is normal (S100). When the controller 40 detects that the input power source Vin is greater than or equal to the low-voltage protection value, it means that the input power source Vin is normal. At this condition, the controller 40 controls the third end C of the loop switch 32 to be coupled to the first end A, and the controller 40 provides the upper-bridge drive signal assembly Sug and the lower-bridge drive signal assembly Slg to the corresponding upper-bridge transistors Su and the lower-bridge transistors S1 so as to drive the motor 100.

When the input power source Vin is interrupted, the controller 40 stops providing the upper-bridge drive signal assembly Sug and the lower-bridge drive signal assembly Slg (S120). Since the controller 40 fails due to the interruption of the input power source Vin, the controller 40 stops providing the upper-bridge drive signal assembly Sug and the lower-bridge drive signal assembly Slg, and the loop switch 32 returns to the normally-closed state where the third end C is coupled to the second end B. At this condition, the battery switch is turned on and the brake switch is turned off (S140). Due to the failure of the controller 40, the battery switch 38 returns to be normally-closed state, and the brake switch 36 returns to be normally-open state. Therefore, the second brake loop where the battery switch 38 is coupled to the second end B of the loop switch and the battery 34 is generated (and the first brake loop is disconnected). At this condition, the battery 34 provides the battery power Vb to the control end of the lower-bridge transistor S1 so that the lower-bridge transistor S1 is constantly turned on to brake the motor 100.

Afterward, continuously detecting whether the input power source is normal (S160). After the controller 40 fails and the input power source Vin returns, the controller 40 continuously detects whether the input power source Vin is greater than or equal to the low-voltage protection value. If the detection result is "NO", the step (S140) is executed again. If the detection result is "YES", the controller 40 controls turning off the battery switch and the brake switch, and provides the upper-bridge drive signal assembly and the lower-bridge drive signal assembly (S180). If the detection result is "YES", it means that the input power source Vin returns to be normal. The controller 40 controls the third end C of the loop switch 32 to be coupled to the first end A, and the controller 40 provides the upper-bridge drive signal assembly Sug and the lower-bridge drive signal assembly Slg to the corresponding upper-bridge transistor Su and the lower-bridge transistor S1 so as to drive the motor 100 again.

If the determination result in step (S100) is "YES", that is the input power source Vin is normal, the controller 40 determines whether the emergency stop command is received (S200). When the controller 40 receives the emergency stop command Ce, it means that the user has pressed an emergency stop button due to unexpected situation, or the motor control system 1 has received certain warning signals (such as over temperature, over current, etc.). If the determination result in step (S200) is "NO", the step (S100) is executed again. If the determination result in step (S200) is "YES", the controller 40 stops providing the upper-bridge drive signal assembly and the lower-bridge drive signal assembly (S220) shown in FIG. 3B. At this condition, the controller 40 still works, and the controller 40 stops providing the upper-bridge drive signal assembly Sug and the lower-bridge drive signal assembly Slg so that the loop switch 32 returns to the normally-closed state where the third end C is coupled to the second end B.

Afterward, the controller 40 controls turning off the battery switch and turning on the brake switch (S240). At this condition, the controller 40 still work, and therefore the controller 40 can control turning off the battery switch 38 and turning on the brake switch 36 to generate the first brake loop where the brake switch 36 is coupled to the second end B of the loop switch and the controller 40 (and the second brake loop is disconnected). Afterward, the controller provides the lower-bridge brake signal to control turning on and turning off the lower-bridge transistor (S260). The lower-bridge brake signal Slb generated by the controller 40 is provided to the corresponding lower-bridge transistor S1 through the couple between the third end C and the second end B so as to brake the motor 100 by turning on and turning off the lower-bridge transistor S1.

Afterward, the controller continuously determines whether the return command is received (S280). If the determination result is "NO", the step (S260) is executed again. If the determination result is "YES", the controller controls turning off the battery switch and the brake switch, and provides the upper-bridge drive signal assembly and the lower-bridge drive signal assembly (S300). This step is similar to step (S180), and the detail description is omitted here for conciseness.

Figure 4A:
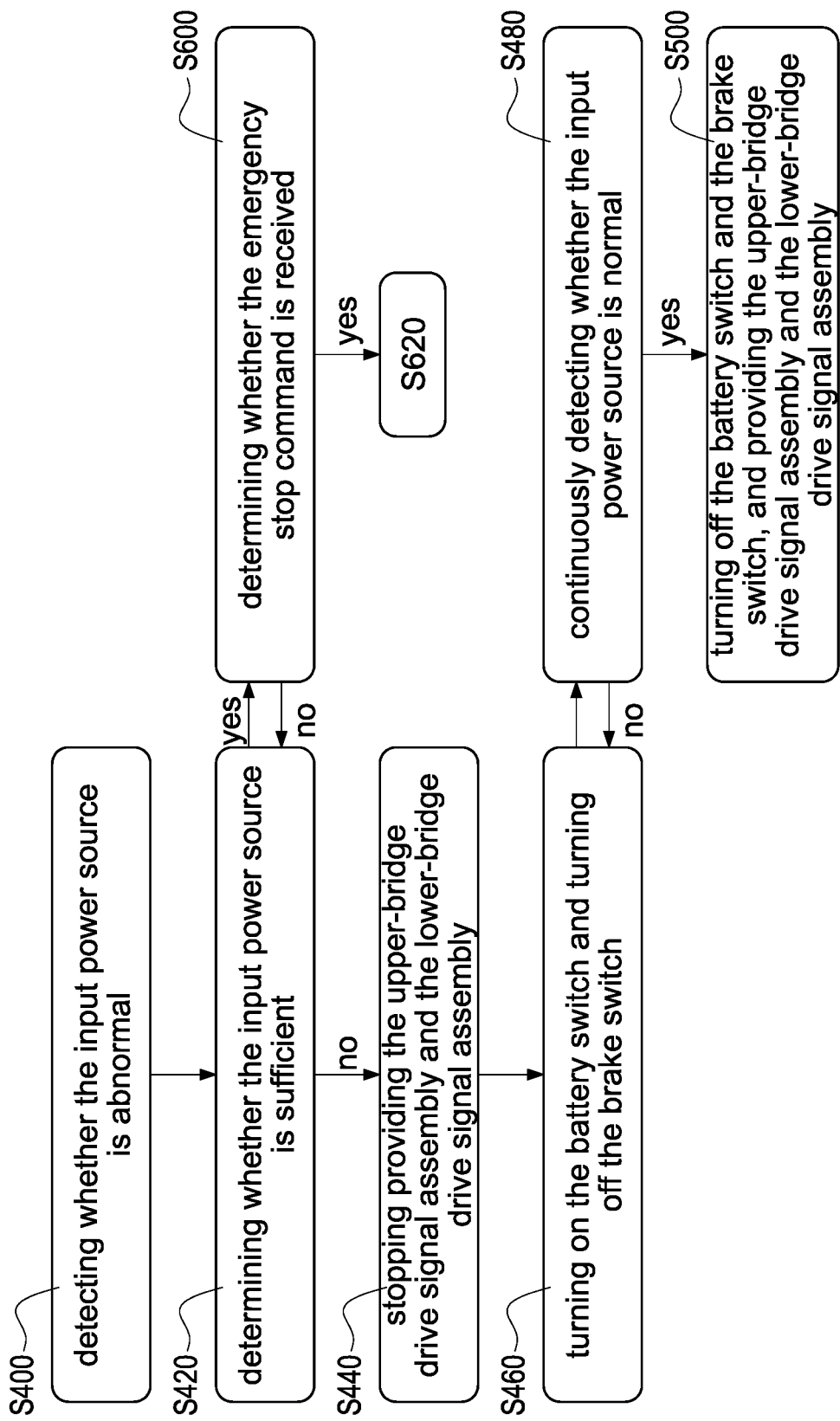
FIG. 4A and FIG. 4B are flowcharts of the motor control method according to a second embodiment of the present disclosure.
Figure 4B:
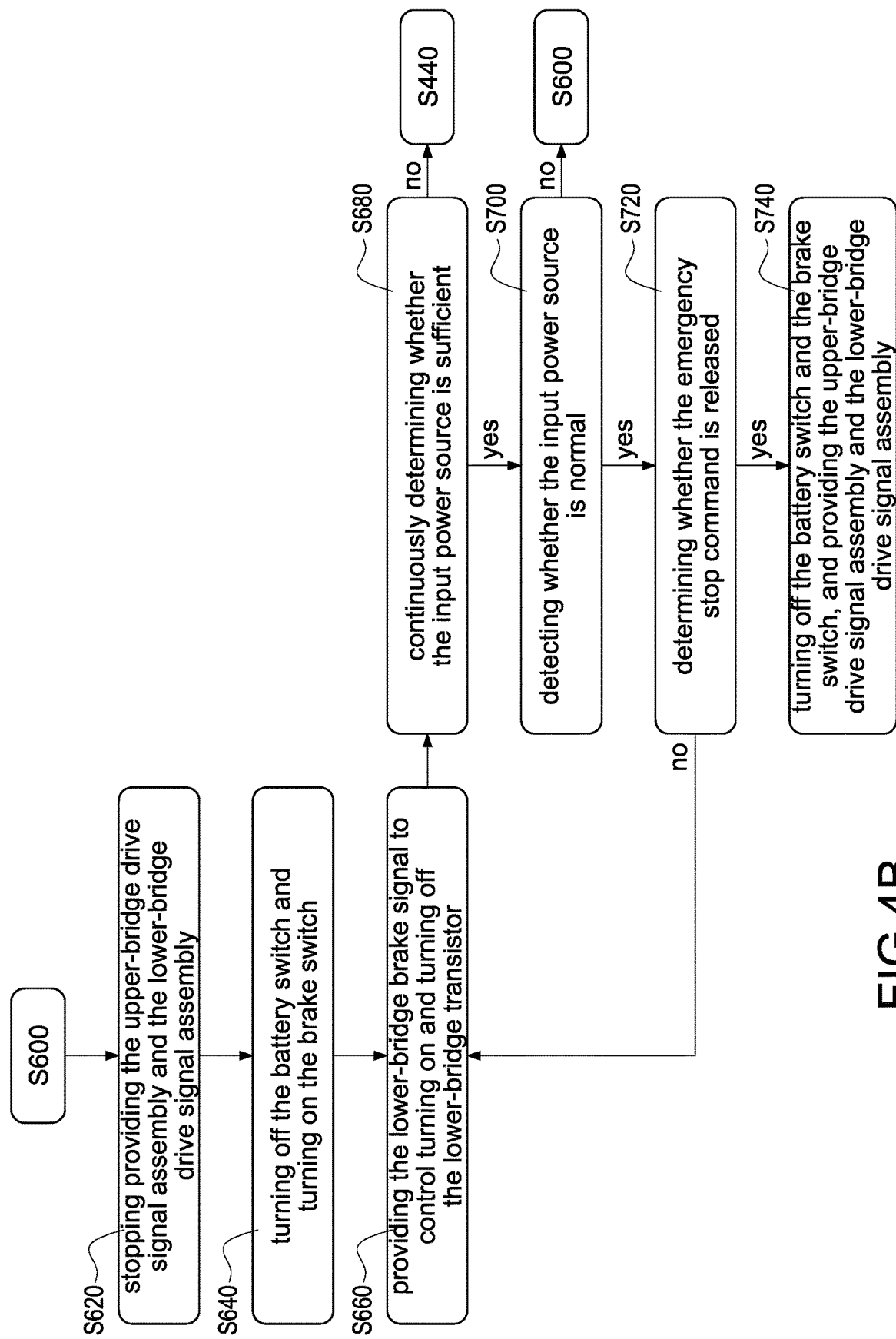

Please refer to FIG. 4A and FIG. 4B, which show flowcharts of the motor control method according to a second embodiment of the present disclosure, and also refer to FIG. 1 to FIG. 3B. The motor control method of the second embodiment is also mainly applied to the circuit structure of FIG. 2C. The method includes steps of: detecting whether the input power source is abnormal (S400). When the controller 40 detects that the input power source Vin is less than or equal to the low-voltage protection value or receives the emergency stop command Ce, it means that the input power source Vin is abnormal. Afterward, the controller determines whether the input power source is sufficient (S420). The controller 40 determines whether the input power source Vin is greater than or equal to the low-voltage protection value to decide whether to brake the motor 100. If the determination result is "NO", the controller stops providing upper-bridge drive signal assembly and the lower-bridge drive signal assembly (S440). Afterward, the battery switch is turned on and the brake switch is turned off (S460). Afterward, continuously detecting whether the input power source is normal (S480). Finally, if the input power source is normal, the controller controls turning off the battery switch and the brake switch, and provides the upper-bridge drive signal assembly and the lower-bridge drive signal assembly (S500), otherwise, the step (S460) is executed again. In particular, the above steps (S420) to (S500) are similar to steps (S120) to (S180) of FIG. 3A. The difference is that since the controller 40 still works, the controller 40 can control turning on or turning off the loop switch 32, the brake switch 36, and the battery switch 38. Since the rest of the actions are similar, the detail description is omitted here for conciseness.

If the determination result in step (S420) is "YES", the controller determines whether the emergency stop command is received (S600). Afterward, if the emergency stop command is received, the controller stops providing the upper-bridge drive signal assembly and the lower-bridge drive signal assembly (S620) shown in FIG. 4B, otherwise, the step (S420) is executed again. Afterward, the controller controls turning off the battery switch and turning on the brake switch (S640). Afterward, the controller provides the lower-bridge brake signal to control turning on and turning off the lower-bridge transistor (S660). Since the above steps (S600) to (S660) are similar to steps (S200) to (S260) of FIG. 3A and FIG. 3B, the detail description is omitted here for conciseness.

Afterward, the controller continuously determines whether the input power source is sufficient (S680). During braking of the motor 100, the controller 40 still continuously detect whether the input power source Vin is less than or equal to the low-voltage protection value. If the detection result is "NO", the step (S440) is executed again. If the detection result is "YES", the controller determines whether the input power source is normal (S700). The controller 40 determines whether the input power source Vin is greater than or equal to the low-voltage protection value to confirm whether the input power source Vin is normal. If the determination result is "NO", the step (S600) is executed again. If the determination result is "YES", the controller determines whether the emergency stop command is released (S720). When confirming that the emergency stop command Ce has been released, it means that the motor control system 1 has eliminated the need to stop the motor 100 in an emergency. That is, if the determination result is "YES", the controller controls turning off the battery switch and the brake switch, and provides the upper-bridge drive signal assembly and the lower-bridge drive signal assembly (S740). If the detection result is "YES", it means that the input power source Vin returns to be normal, and the emergency stop command Ce has been released so that the motor 100 can be driven again. The step is similar to the step (S180) of FIG. 3A, and the detail description is omitted here for conciseness. If the determination result of step (S720) is "NO", the step (S660) is executed again. In particular, the method steps of FIG. 3A and FIG. 3B and the method steps of FIG. 4A and FIG. 4B may be used in combination so that the motor control system 1 can have the functions of power failure (interruption) braking, emergency braking, and power-insufficient braking at the same time.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A motor control system coupled to an input power source and a motor, wherein the motor control system comprises:
   an inverter comprising a plurality of upper-bridge transistors and a plurality of lower-bridge transistors; a first end of each upper-bridge transistor coupled to a high-voltage level of the input power source, a second end of each upper-bridge transistor correspondingly coupled to a first end of each lower-bridge transistor, and a second end of each lower-bridge transistor coupled to a low-voltage level of the input power source,
   a brake comprising a plurality of loop switches, each loop switch having a first end, a second end, and a third end; the third end of each loop switch correspondingly coupled to a control end of each lower-bridge transistor, and the third end of each loop switch selectively coupled to the first end or the second end, and
   a controller coupled to a control end of each upper-bridge transistor and the first end of each loop switch,
   wherein when the controller detects that the input power source is greater than a low-voltage protection value, the controller controls the third end of each loop switch to couple to the first end, and the controller provides an upper-bridge drive signal assembly to operate each upper-bridge transistor and provides a lower-bridge drive signal assembly to operate each lower-bridge transistor so as to drive the motor.

2. The motor control system as claimed in claim 1, wherein when the controller detects that the input power source is less than or equal to the low-voltage protection value or receives an emergency stop command, the third end of each loop switch is coupled to the second end, and the controller provides a lower-bridge brake signal through the second end to operate each lower-bridge transistor so as to brake the motor.

3. The motor control system as claimed in claim 2, wherein when the third end of each loop switch is coupled to the second end, the controller turns off each upper-bridge transistor, and the controller selectively operates each lower-bridge transistor simultaneously turning on or turning off through the lower-bridge brake signal.

4. The motor control system as claimed in claim 2, wherein the controller adjusts a braking force of braking the motor by adjusting a signal duty cycle of the lower-bridge brake signal; the controller determines whether the motor enters a braking stall state to increase the signal duty cycle by detecting a rotation speed of the motor.

5. The motor control system as claimed in claim 2, wherein the controller adjusts a braking smoothness of braking the motor by adjusting a switching frequency of the lower-bridge brake signal.

6. The motor control system as claimed in claim 2, wherein the controller further comprises:
a brake switch coupled to the second end of the loop switch and the controller;
wherein when the controller detects that the input power source is less than or equal to the low-voltage protection value or receives the emergency stop command, the controller controls turning on the brake switch so that the second end of the loop switch is coupled to the controller.

7. The motor control system as claimed in claim 1, wherein the brake further comprises a battery coupled to the second end,
wherein when the controller detects that the input power source is interrupted, the controller turns off each upper-bridge transistor, and the third end is coupled to the second end of each loop switch so that the battery provides a battery power to maintain each lower-bridge transistor to be constantly turned on.

8. The motor control system as claimed in claim 7, wherein the brake further comprises a battery switch coupled to the second end of the loop switch and the battery,
wherein when the controller detects that the input power source is interrupted, the battery switch is turned on so that the second end of the loop switch is coupled to the battery.

9. The motor control system as claimed in claim 1, wherein the motor is a permanent magnet motor, and the motor generates a back electromotive force to feed back to the inverter when the motor is braked; the controller turns on each lower-bridge transistor so that the back electromotive force is released to the low-voltage level through each lower-bridge transistor.

10. The motor control system as claimed in claim 1, wherein when the controller controls the third end to be coupled to the second end of each loop switch, and the controller detects that the input power source returns to be greater than the low-voltage protection value, the controller controls the third end of each loop switch to switch from being coupled to the second end to being coupled to the first end.

11. A motor control method applied to a motor control system, the motor control system coupled to an input power source and a motor, and the motor control system comprising a brake and an inverter; the inverter comprising a plurality of upper-bridge transistors and a plurality of lower-bridge transistors, and each upper-bridge transistor coupled to a high-voltage level of the input power source and correspondingly coupled to each lower-bridge transistor, and each lower-bridge transistor coupled to a low-voltage level; the brake comprising a drive loop and a brake loop, and the drive loop and the brake loop coupled to each lower-bridge transistor, the method comprising steps of:
determining whether the input power source is less than a low-voltage protection value, and
turning on the drive loop and turn off the brake loop when the input power source is greater than the low-voltage protection value,
wherein when the drive loop is turned on, an upper-bridge drive signal assembly is provided to operate each upper-bridge transistor, and a lower-bridge drive signal assembly is provided to operate each lower-bridge transistor through the drive loop so as to drive the motor.

12. The motor control method as claimed in claim 11, wherein when the input power source is less than or equal to the low-voltage protection value or an emergency stop command is received, each the upper-bridge transistor is turned off, a first brake loop of the brake loop is turned on, and the drive loop is turned off,
wherein when the first brake loop is turned off, a lower-bridge brake signal is provided through the first brake loop to selectively and simultaneously turn on or turn off each lower-bridge transistor.

13. The motor control method as claimed in claim 12, further comprising steps of:
determining whether the motor enters a braking stall state by detecting a rotation speed of the motor, and
increasing a signal duty cycle of the lower-bridge brake signal to increase a braking force of braking the motor when the motor enters the braking stall state.

14. The motor control method as claimed in claim 12, further comprising a step of:
adjusting a braking smoothness of braking the motor by adjusting a switching frequency of the lower-bridge brake signal.

15. The motor control method as claimed in claim 11, wherein the brake loop further comprises a second brake loop, and the motor control method further comprises steps of:
turning off each upper-bridge transistor, turning the second brake loop, and turning off the drive loop when the input power source is detected to be interrupted, and
maintaining each lower-bridge transistor to be constantly turned on by a battery power of the second brake loop.

16. The motor control method as claimed in claim 11, further comprising a step of:
controlling turning off the brake loop and turning on the drive loop when the brake loop is turned on and the drive loop is turned off and the input power source is detected to return to be greater than the low-voltage protection value.

* * * * *